UNITED STATES PATENT OFFICE.

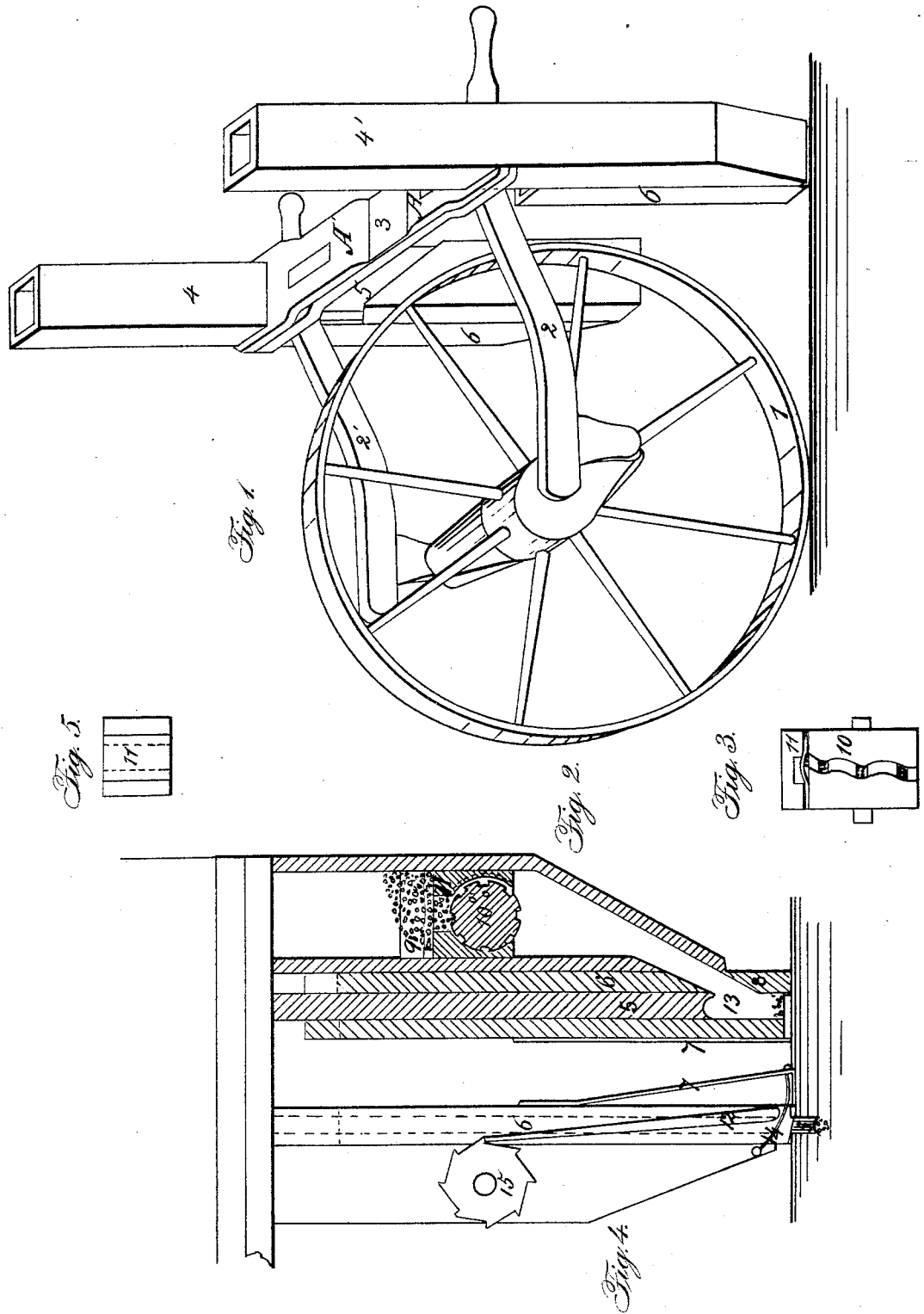

SYLVANUS RICHARDSON, OF JERICHO, VERMONT.

IMPROVEMENT IN CORN-PLANTERS.

Specification forming part of Letters Patent No. 17,584, dated June 16, 1857.

*To all whom it may concern:*

Be it known that I, SYLVANUS RICHARDSON, of Jericho, in the county of Chittenden and State of Vermont, have invented a new and Improved mode of Constructing Corn-Planters; and I do hereby declare that the following is a full and exact description thereof, reference being had to the accompanying drawings, and to the letters of reference marked thereon.

The nature of my invention consists in the arrangement of two planters, 4 4', to a horizontal board, 3, connected to a wheel, 1, and also the internal arrangement of the planters, (shown at Fig. 2,) the whole so arranged as to enable one to plant two hills of corn at a time by one motion only as fast nearly as one can walk.

To enable others skilled in the art to make and use my invention, I will proceed to describe its construction.

Figure 1 is a perspective view of the corn-planter. Fig. 2 is a vertical cross-section of the planters. Fig. 3 is a surface view of the seed-cylinder 10, and also a top view of the gage 11. Fig. 4 is a verticle section of the planters, showing its external arrangement, the notch-wheel 15, spring 12, and spring-valve 7. Fig. 5 is a surface view of gage 11.

In the first place, I make a wheel, 1, about three feet in diameter, of sufficient strength to sustain a light burden, and a shaft to the wheel about thirty inches long. To each end of the shaft I attach an arm, 2, about three feet long. Directly across each arm I place a horizontal board, 3, letting the ends of the arms 2 project about eight inches, which ends I use for handles to manage the corn-planter. The horizontal board 3, I make about eight inches wide, firmly fastened to the arms. On top and at each end of the horizontal board I place a short board, to which I attach the planters 4 4'. This short board is made to slide endwise, so as to enable me to spread the planters farther apart or nearer together, as may be required, and these pieces A A' are firmly attached to the horizontal board 3 by set-screws. The planters 4 4', I make about thirty inches long and three inches square on the inside, tapering at the lower end, as shown at Fig. 4. On one side of each planter I attach a plunger, 5, firmly to the planter, leaving a space between it and the planter. Around this plunger I place a slide, 6, designed to slide up and down about three inches. At the lower end, next to the planter, I make an opening through the slide 6 for the corn to pass under the end of the plunger, as seen at 13, Fig. 2. The slide 6, when the planters are put down to the ground, is even with the planter at the lower end, and when the planters are raised the slide drops of its own weight, but while the planters are down to the ground that portion of slide 8 is up, and prevents the corn from passing any farther until the slide falls and lets the corn pass under the plunger 5. About one foot from the lower end of the planter I place a seed-cylinder, 10, three inches long and three inches in diameter, with journals on each end. This cylinder has eight holes, O O, of sufficient size and depth to hold five kernels of corn, the holes equal distance apart. On one side of this seed-cylinder I place a gage, 11. Closely fitting the circle of the seed-cylinder in this gage I cut a slight groove, as seen at 11, Fig. 3. Directly against the holes in the seed-cylinder, over this groove, I place india-rubber. This arrangement is to prevent the corn from catching or crowding between the gage and the seed-cylinder. On the opposite side, *a*, of the seed-cylinder 10 I fit a piece of wood merely to prevent the corn from falling down on that side. Directly over and at right angle to the seed-cylinder I place a guard, 9, a round piece of wood one inch in diameter. This is to prevent the corn from packing too closely to the seed-cylinder. On one of the journals of the seed-cylinder I place a notch-wheel, 15. On the outside of the planter the number of notches in the wheel is equal to the number of holes in the seed-cylinder 10. To turn this notch-wheel I place a spring, 12, attached to slide 6, so as when the planters are put to the ground the slide raises and turns the notch-wheel and seed-cylinder one notch, and empties one hole of its corn. At this same period of time, as the corn leaves the seed-cylinder and lodges against that portion of slide 8, the plunger 5 carries the preceeding charge into the ground, as shown at 5. At the lower end of the planter, Fig. 4, and when the planters are raised, the slide drops of its own weight, and the corn passes under the end of the plunger 5, and is prevented from passing out by a spring-valve, 7, having a cord, 14, fastened to the planter at one end, and the other end to the valve, so when the slide raises as the planters are put to the ground the cord slackens and the valve opens and the plunger follows the corn into the ground.

I will now state what I claim as new and desire to secure by Letters Patent.

I claim—

The seed-cylinder 10, operated by spring 12, in combination with slide 6 and spring-valve 7, constructed in the manner and for the purposes set forth.

SYLVANUS RICHARDSON.

Witnesses:
   GEO. B. OAKES,
   HENRY BRADLEY.